United States Patent [19]
Ikeda

[11] Patent Number: 5,919,339
[45] Date of Patent: Jul. 6, 1999

[54] ROTARY EVAPORATOR

[75] Inventor: Naoki Ikeda, Yokohama, Japan

[73] Assignees: Yamato Scientific Co., Ltd; Ikeda Glass Co., Ltd, both of Tokyo, Japan

[21] Appl. No.: 08/818,620

[22] Filed: Mar. 14, 1997

[51] Int. Cl.⁶ ........................................ B01D 3/08
[52] U.S. Cl. .................. 202/238; 202/189; 202/266; 203/DIG. 2; 422/103; 422/104
[58] Field of Search ..................... 202/238, 237, 202/266, 270, 188–189; 203/DIG. 2; 422/101, 102, 103, 104; 403/24, 37; 159/6.1, DIG. 41

[56] References Cited

U.S. PATENT DOCUMENTS

| | | | |
|---|---|---|---|
| 3,342,696 | 9/1967 | Bush | 202/238 |
| 4,081,331 | 3/1978 | Weiss | 203/10 |
| 4,764,250 | 8/1988 | Riehl et al. | 202/238 |
| 4,780,178 | 10/1988 | Yoshida et al. | 203/DIG. 2 |
| 5,447,077 | 9/1995 | Lautenschläger | 422/102 |

FOREIGN PATENT DOCUMENTS

| | | | |
|---|---|---|---|
| 0433729 | 4/1994 | European Pat. Off. | |
| 2178755 | 11/1973 | France | 202/238 |
| 2700894 | 7/1978 | Germany | 202/238 |
| 3641152 | 6/1988 | Germany | |
| 4213430 | 1/1993 | Germany | |
| 218601 | 8/1989 | Japan | |
| 271479 | 9/1994 | Japan | |

*Primary Examiner*—Virginia Manoharan
*Attorney, Agent, or Firm*—Thomas, Kayden, Horstemeyer & Risley

[57] ABSTRACT

A rotary evaporator of the present invention has an insertion area of a rotary joint 33 in a straight shape. This area is movably inserted to a motor rotor 27 of a motor by a sleeve 31 or 31' in an axial direction. Bushes 57 are inserted between the rotary joint 33 and the sleeve 31 or 31' for integrating the rotary joint 33 and the sleeve 31 or 31' by a fastening force generated by a fastening cap 61 or 61' engaged with a screw section of the sleeve 31 or 31'. With the above-described structure, when the outer peripheral surface of the rotary joint 33 is abraded by a sealing member 43, the fastening cap 61 is loosened and the rotary joint 33 is slightly moved to the axial direction so that the rotary joint 33 is moved to an appropriate or an optimum position along the axial direction. On the other hand, when a sample container is small, the fastening cap 61 or 61' is loosened and the rotary joint 33 is moved to the axial direction so that the rotary joint 33 is moved to an appropriate or an optimum position along the axial direction. Thereafter, the fastening cap 61 or 61' is fastened again.

8 Claims, 5 Drawing Sheets

ROTARY EVAPORATOR

BACKGROUND OF THE INVENTION

1. Field of the Invention

The present invention relates to a rotary evaporator, and relates more particularly to a rotary evaporator of which rotary joint can be easily moved for adjusting its position along the axial direction thereof.

2. Description of the related Art

In general, a rotary evaporator has such an outline structure that a sample container which is rotated integrally with a rotary joint, with one part of which being soaked within a water bath, is connected to one end of the rotary joint that is insertedly supported by a motor rotor of a motor through a sleeve, and that a condenser mounted on a motor main body of the motor is disposed in the other side of the rotary joint.

The motor main body is structured by a stator and a motor housing. A rotation force is given to the rotor of the motor when a current is supplied to the motor. Accordingly, when the motor rotor is rotated, a rotation force is given to the sample container soaked within the water bath, through the rotary joint.

To be more specific, the rotary joint is insertedly supported by the sleeve in a insertion area. The sleeve is fixed in engagement with the motor rotor. Furthermore, the sleeve is rotatably supported by the motor main body at both ends thereof by means of bearings.

The rotary joint has a step section formed part of which is thick at the end portion of the insertion area near the sample container and the rotary joint is supported by the sleeve with an engagement between the step section and the sleeve. The step section defines an area of movement of the rotary joint along the axial direction by cooperating with a stopper ring provided in the sleeve. A sealing member is provided at the other end of the insertion area of the rotary joint near the condenser to seal between the rotary joint and the condenser by rotatably contacting with the outer peripheral surface of the rotary joint. The seal surface of the sealing member is in rotational contact with the outer peripheral surface of the rotary joint.

In the rotary evaporator described above, since the movement of the rotary joint in the axial direction is restricted by the stopper ring, the rotary joint is rotated in the state that the outer peripheral surface of the rotary joint is always contacted with the sealing member at the same position. Therefore, during a long period of used of the rotary joint, the outer peripheral surface of the rotary joint is abraded by the sealing member since the rotary joint is made of glass. Then a leakage occurs from the abraded portion of the rotary joint.

Further, when the sample container is too small to be sufficiently soaked within the water bath, it is necessary to prepare an attachment such as a joint means between the sample container and the rotary joint to have a long arm for connecting the sample container and the rotary joint so that the sample container can be sufficiently soaked within the water bath.

Furthermore, since the rotary joint is made of glass as explained above and this has a unique shape at the step section, the above described rotary joint and sleeve are not desirable from the viewpoint of cost and manufacturing steps thereof are complex and difficult.

SUMMARY OF THE INVENTION

The present invention is conceived to solve the above described points. It is an object of the present invention to provide a rotary evaporator in which a rotary joint can be easily moved along the axial direction thereof for adjusting its position when the outer peripheral surface of the rotary joint has been abraded by a sealing member.

It is another object of the present invention to provide a rotary evaporator in which a rotary joint is moved to an appropriate position along the axial direction thereof to enable setting a sample container at an optimum position without requiring an attachment even in case a sample container is small.

It is still another object of the present invention to provide a rotary evaporator of which a rotary joint has a straight shape at a portion where the rotary joint is inserted into a sleeve to eliminate the step section thereby the forms and the manufactures of the rotary joint and the sleeve are simplified then the cost of the rotary evaporator is reduced.

In order to achieve the above-described objects, the rotary evaporator of the present invention includes a motor having a motor main body and a rotary means, a rotary joint insertedly supported and movable in an axial direction to the rotary means with an area of the insertion formed in a straight shape, a sample container connected to one end of the rotary joint, a condenser located near the other end portion of the rotary joint and mounted on the motor main body, a coupling means disposed in a space between the rotary means and the rotary joint, and a fastening means for pressuring the coupling means to integrate the coupling means with the rotary joint and the rotary means.

More specifically, the rotary means is provided with a motor rotor and a sleeve integrally engaged with the motor rotor.

Furthermore, it is desirable that the fastening means is a fastening cap engaged with the sleeve to pressure the coupling means toward the other end portion of the rotary joint by a fastening force generated by the engagement.

On the other hand, it is also desirable that the fastening means is a fastening cap engaged with the motor main body to pressure the coupling means toward the other end portion of the rotary joint by a fastening force generated by the engagement.

Still further, the coupling member includes a plurality of bushes slidably mounted on the outer peripheral surface of the rotary joint and elastically deformable O ring disposed between the bushes so that the O ring is pressured by the fastening force through the bushes thereby said O rings are tightly contacted to the outer peripheral surface of the rotary joint and to the inner surface of the sleeve by elastic deformation.

In the rotary evaporator having the above-described construction according to the invention, the rotation of the motor rotor is transmitted to the rotary joint to rotate the rotary joint. With this arrangement, the rotation is transmitted to the sample container which is partially soaked within the water bath, and steam generated within the sample container passes through the rotary joint and is condensed by the condenser.

In this connection, when the outer peripheral surface of the rotary joint is abraded by the sealing member, the fastening cap is loosened and the rotary joint is slightly moved in the axial direction thereof so that the rotary joint can be used again.

When the sample container is small, the fastening cap is loosened and the rotary joint is moved to an appropriate position along the axial direction thereof, and the fastening cap is fastened again so that the sample container can be set to an optimum position without using an attachment such as a joint member.

According to the above-described rotary evaporator of the present invention, the rotary joint can be moved in the axial direction for adjusting its position, and the contact position between the sealing member and the rotary joint can be easily adjusted. Therefore, when the outer peripheral surface of the rotary joint is abraded, the rotary joint is able to be moved in the axial direction in such a manner that the sealing member is rotatably contacted to an unabraded portion of the rotary joint. Then a leakage from the abraded portion can be prevented by changing the contact position therebetween and the rotary joint can be continuously used. Further, the sample container can be set to an optimum position of the water bath without using an attachment regardless of the size of the sample container.

Further, since the area of insertion of the rotary joint into the sleeve has a straight shape, the step section is eliminated thereby the form and the manufacture of the rotary joint and the sleeve are simplified then the cost of the rotary evaporator is reduced.

DESCRIPTION OF THE PREFERRED EMBODIMENTS

Embodiments of the present invention will be explained in detail below with reference to FIG. 1 to FIG. 5.

Figure 1:
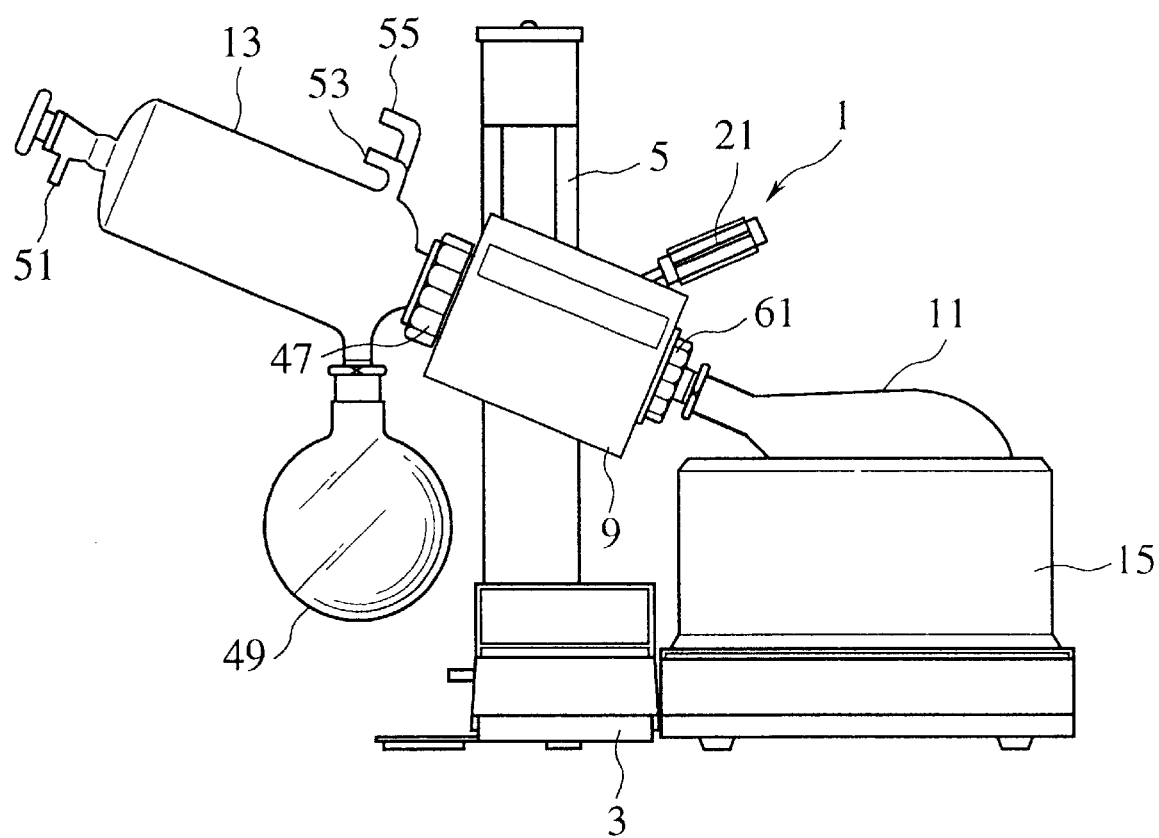
FIG. 1 is a front view of the rotary evaporator according to the present invention supported by a base and soaked partially by a water bath.
Figure 2:
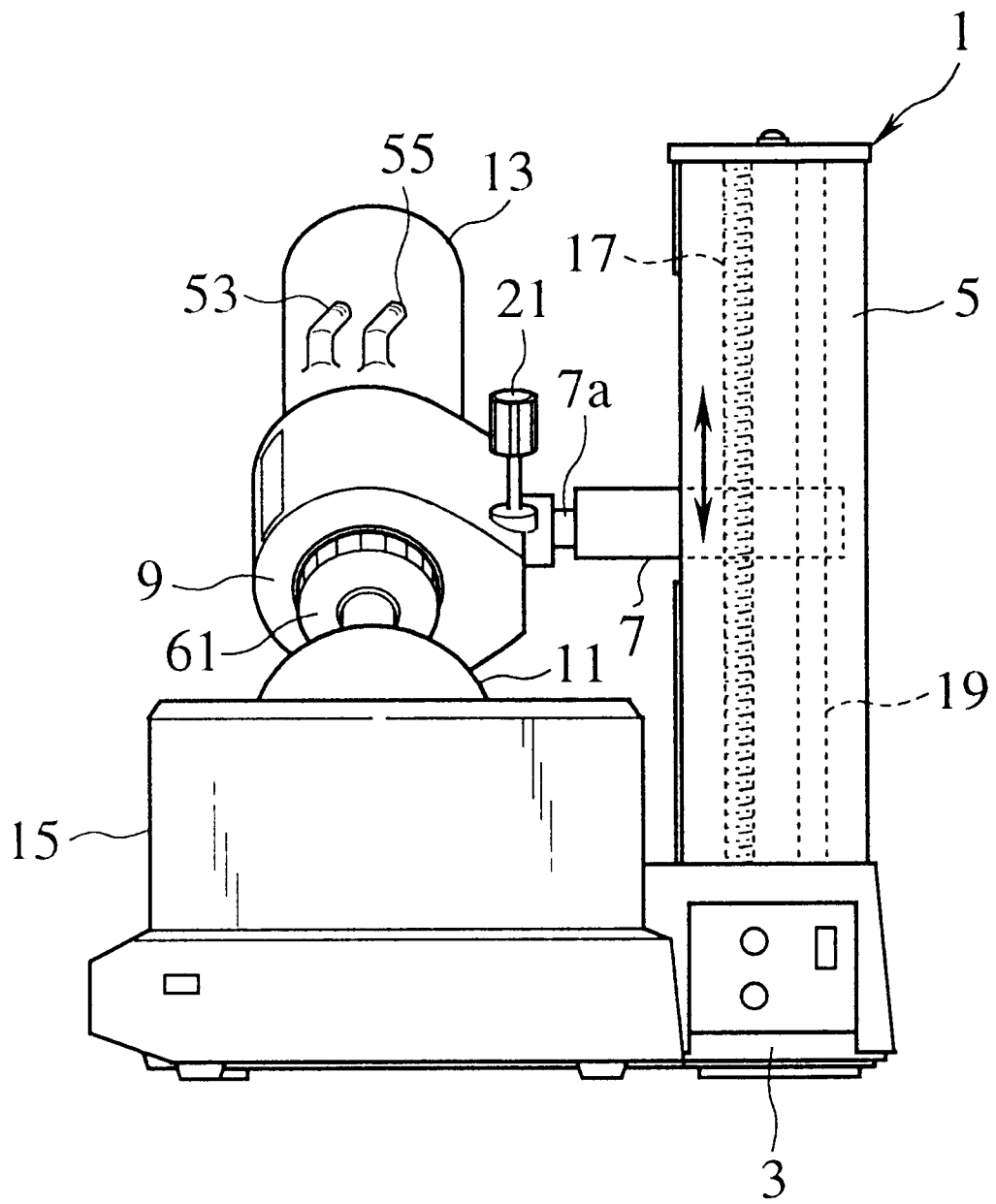
FIG. 2 is a side view of the rotary evaporator according to the present invention supported by the base and soaked partially by the water bath.
Figure 3:
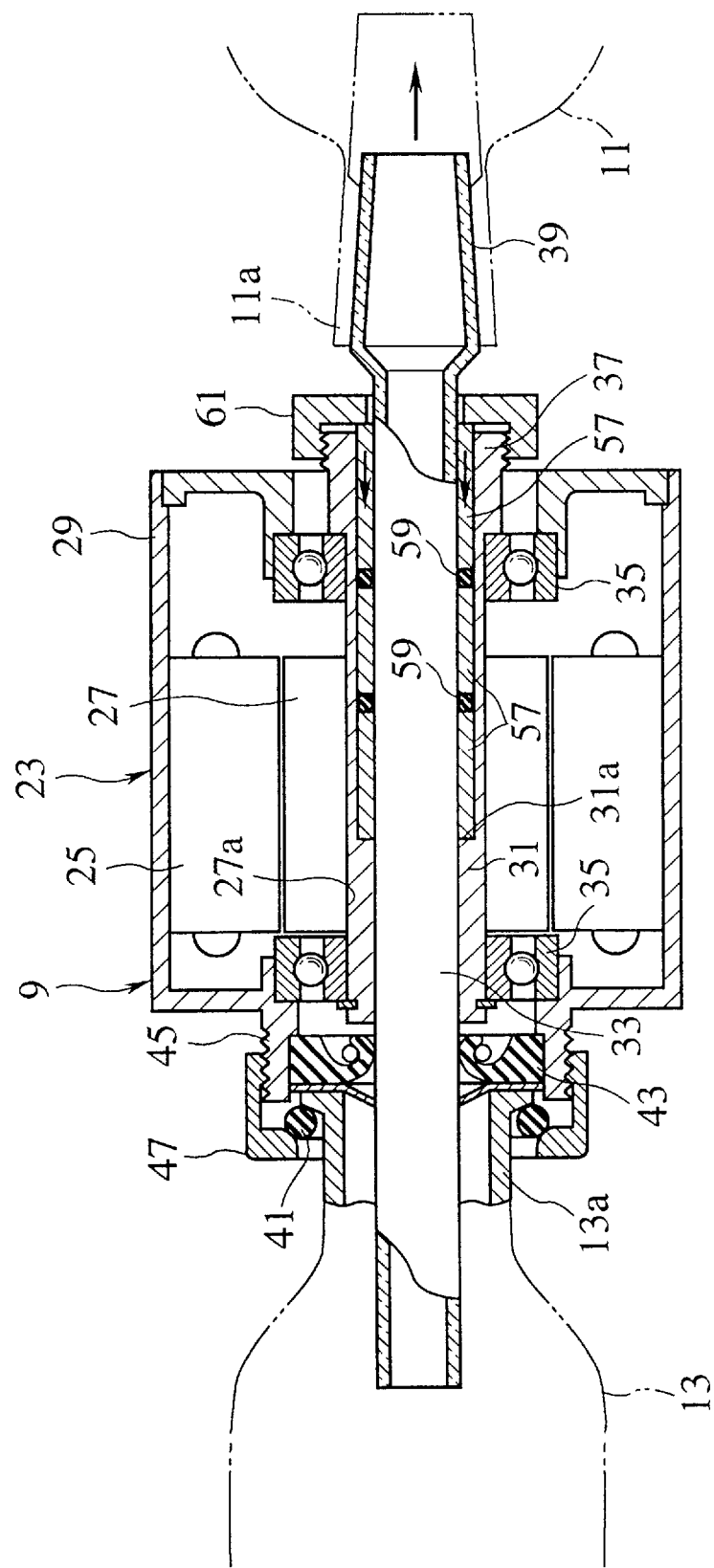
FIG. 3 is a sectional view showing one of the embodiments according to the present invention.

Referring to FIGS. 1 and 2, 1 denotes a rotary evaporator of the invention, which is structured by a supporting pillar 5 stood on a base 3, a motor 9 which becomes a rotary driving unit supported by the supporting pillar 5 through a lifting unit 7 capable of moving upwards and downwards, a sample container 11 such as a flask to which a rotation is applied by the motor 9, a condenser 13 mounted on the upper side of a motor main body 23 of the motor 9 as shown in FIG. 3, a receiving flask 49 connected to the condenser 13 as shown in FIG. 1, and a water bath 15 for heating the sample container 11.

The lifting unit 7 is provided inside the supporting pillar 5 as shown in FIG. 2 and is engaged with a screw bar 17 which can rotate forward and backward by being applied with a rotation force from a driving motor through a deceleration mechanism (not shown) consisting of a worm and worm-wheel (not shown). By the forward or backward rotation of the screw bar 17, the lifting unit 7 can move upwards or downwards by being guided by a guide rail 19 which is elongated vertically. The motor 9 which becomes a rotation driving unit is fixedly supported by a supporting axis 7a of the lifting unit 7 in such a manner that the motor 9 can be rotated by a lever 21. In other words, the motor 9 can be rotated (or sloped) when the lever 21 is loosened, and the motor 9 can be integrally fixed to the supporting axis 7a when the lever 21 is fastened.

As shown in FIG. 3, the motor 9 comprises a motor rotor 27 and the motor main body 23 constructed by a motor housing 29 and a stator 25. When a current flows to the motor 9, a rotation force is applied to the motor rotor 27. A sleeve 31 is integrally and fixedly inserted into a rotor hole 27a of the motor rotor 27, and a rotary joint 33 is insertedly supported by the sleeve 31 through bushes 57 and O rings 59.

The sleeve 31 is rotatably supported at both ends thereof by bearings 35 and an end portion of the sleeve 31 stretched out from the motor main body 23 forms a screw section 37.

The rotary joint 33 is made of a hollow-shaped glass and the insertion area thereof has a straight shape. At one end of the rotary joint 33, a tapered connection section 39 is formed, and a mouth section 11a of the sample container 11 such as a flask is connected to the connection section 39, with the other end of the rotary joint 33 being extended to the inside of the condenser 13.

The condenser 13 located near the end portion of the rotary joint 33 is made of glass and its mouth section 13a is integrally supported by being coupled with the motor main body 23 through a ring-shaped member 41 elastically deformable by a fastening force of a fastening cap 47 which is engaged with a screw section 45 provided outside the motor housing 29. When the fastening cap 47 is fastened, a sealing is secured in the connection area of the condenser 13 by applying a pressure to a sealing member 43 elastically connected with the outer peripheral surface of the rotary joint 33 inside the screw section 45 through the ring-shaped member 41 provided inside the fastening cap 47. As shown in FIGS. 1 and 2, on the condenser 13, the receiving flask 49, a sample poring opening 51, a vacuum absorbing opening 53 and a cooling water connection opening 55 are provided respectively. A vacuum pump (not shown) is connected to the vacuum absorbing opening 53 and a water supply tube (not shown) is connected to the cooling water connection opening 55.

Figure 4:
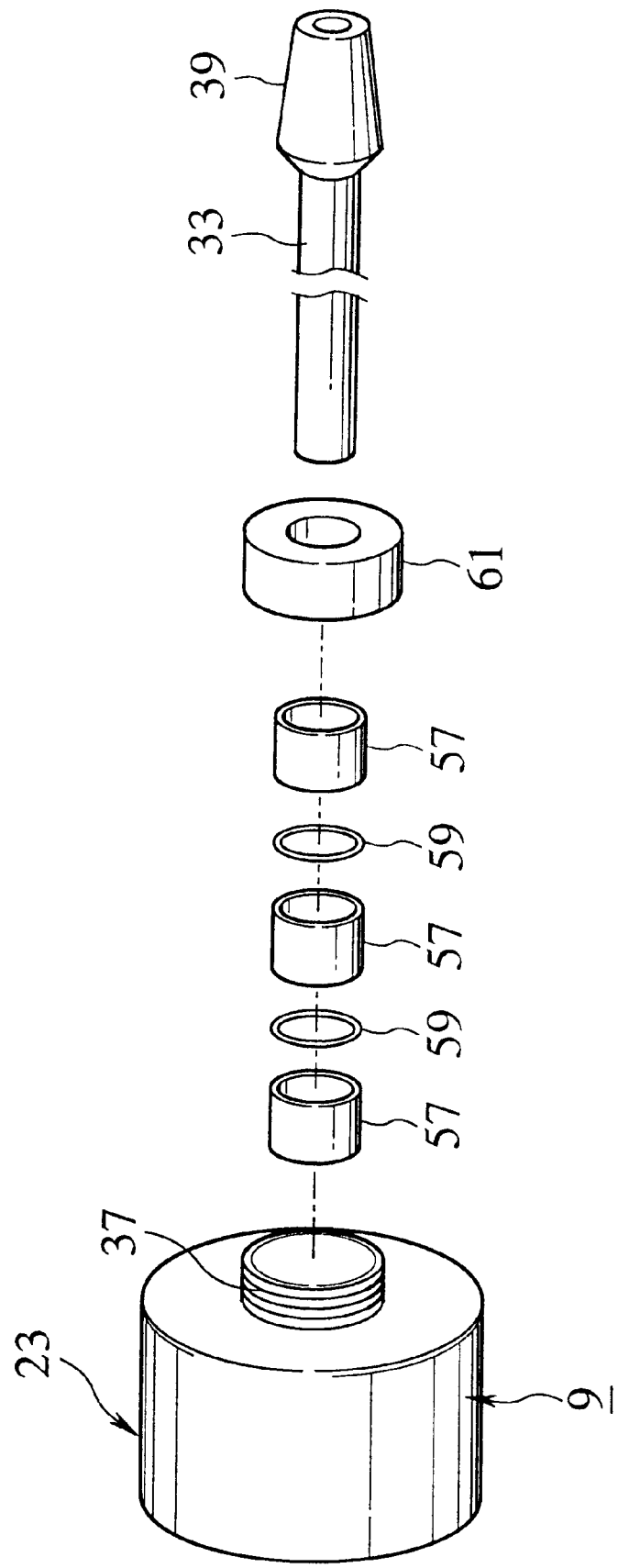
FIG. 4 is an exploded view of the assembling construction including the coupling means, the fastening means, motor main body and the rotary joint.

A plurality of bushes 57 and a plurality of O rings 59 are provided respectively in the area between the outer peripheral surface of the rotary joint 33 and the inner surface of the sleeve 31. The plurality of O rings 59 are disposed between the bushes 57. The plurality of bushes 57 and the O rings 59 are alternately arranged as shown in FIG. 4.

The O rings 59 are pressured in the axial direction by a fastening force applied when the fastening cap 61 engaged with the screw section 37 provided in the sleeve 31 is fastened. When the bush 57 in the far end is brought into contact with a step section 31a of the sleeve 31, the O rings 59 are elastically deformed by being sandwiched between the bushes 57. This makes the O rings 59 to be in strong elastic contact with the outer peripheral surface of the rotary joint 33 and the inner surface of the sleeve 31 so that a strong frictional force is generated, thereby the plurality of bushes 57 and the O rings 59 are integrally coupled with the sleeve 31 and the rotary joint 33. In other words, the O rings 59 are tightly pressuredly contacted to the outer peripheral surface of the rotary joint 33 and to the inner surface of the sleeve 31 by elastically deformed.

Figure 5:
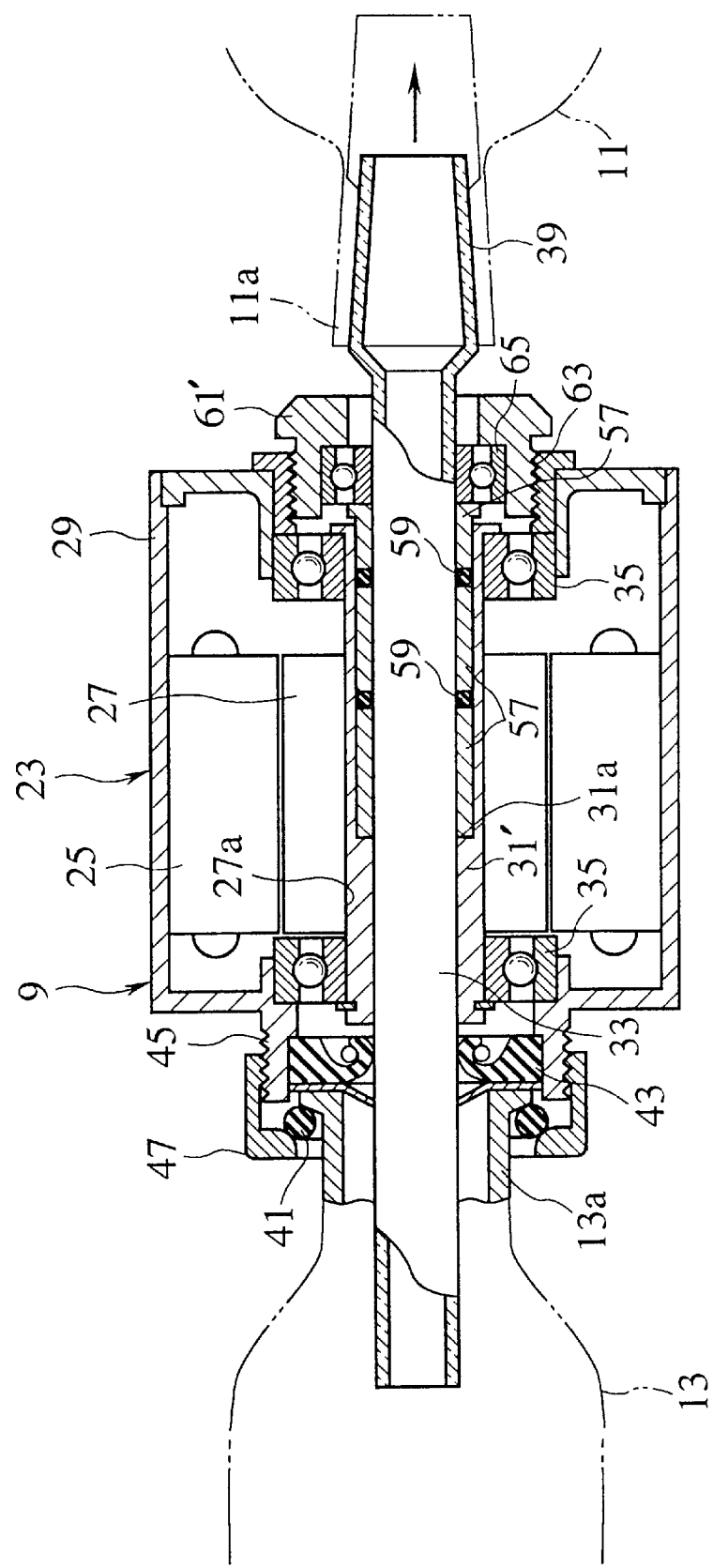
FIG. 5 is a cross sectional view similar to FIG. 3 for showing the outline of another embodiment of the fastening cap.

Referring now to FIG. 5, the second embodiment of the invention is described hereinafter. In this embodiment, as an alternative, the fastening cap 61 may be engaged with the motor main body 23. The sleeve 31' and the rotary joint 33 are integrally coupled by the fastening force of the fastening cap 61', as shown in FIG. 5 in the same manner of the first embodiment.

To be more specific, the structure may be such that a screw section 63 engaged with the screw cap 61' is provided at the side of the motor housing 29 of the motor main body 23, the bushes 57 and the O rings 59 are alternately disposed between the sleeve 31' and the rotary joint 33, and bearings 65 which becomes a pressure transfer means is provided between a final ring 57 and the fastening cap 61' in the same manner of the first embodiment.

With the above-described structure, the fastening cap 61' is supported in engagement at the side of the motor main body 23, and the bushes 57 are pressured through the bearings 65 by the fastening force of the fastening cap 61 so that the O rings 59 are brought into strong elastic contact with the inner surface of the sleeve 31 and the outer peripheral surface of the rotary joint 33 to generate a frictional force, which enables the integrated coupling between the sleeve 31 integrated with the motor rotor 27 and the rotary joint 33.

As to the structure of the rotary evaporator 1 other than the specific structure described above, the water bath 15 has a heater (not shown) for heating water and a temperature sensor (not shown) for detecting a water temperature. The heater is on-and-off controlled by a detection signal from the temperature sensor through a control section (not shown), and the water inside the water bath 15 is controlled by a pre-set water temperature.

According to the rotary evaporator 1 having the structure described above, when a rotational force is applied to the motor rotor 27, the rotary joint 33 and the sample container 11 are rotated so that the steam generated within the sample container 11 by the water bath 15 is absorbed by the condenser 13 through the rotary joint 33 and is condensed. When the holding force between the rotary joint 33 and the sleeve 31 is in short during this operation, the fastening cap 61 is fastened to increase the holding force.

Further, since the rotary joint 33 can be moved in the axial direction to adjust its position by loosening the fastening cap 61, the rotary joint 33 can be used again by sliding the position at which the sealing member 43 is in contact with another portion of the rotary joint 33. Further, by making a move in the right direction as shown by an arrow in FIG. 3, for example, the sample container 11 can be set to an optimum position in the water bath 15 even if the size of the sample container 11 is small.

What is claimed is:

1. A rotary evaporator, comprising:

a motor having a motor main body and a rotary means;

a rotary joint insertedly supported and movable in an axial direction relative to said rotary means, with an area of the insertion formed in a straight shape;

a sample container connected to one end of said rotary joint;

a condenser located adjacent the other end portion of said rotary joint and mounted on said motor main body;

a plurality of bushes slidably mounted in a space between said rotary means and said rotary joint;

at least one elastically deformable O ring disposed between said bushes; and a fastening means for pressuring said bushes against said rotary means, wherein said at least one O ring is pressured by said fastening means through said bushes so that said at least one O ring is tightly contacted to the outer peripheral surface of said rotary joint and to the inner surface of said rotary means by elastic deformation, thereby integrating said rotary joint and said rotary means.

2. A rotary evaporator according to claim 1, wherein said rotary means is provided with a motor rotor and a sleeve integrally engaged with said motor rotor.

3. A rotary evaporator according to claim 2, wherein said fastening means is a fastening cap engaged with said sleeve to pressure said bushes toward the other end portion of said rotary joint with a fastening force generated by said engagement.

4. A rotary evaporator according to claim 2, wherein said fastening means is a fastening cap engaged with said motor main body to pressure said bushes toward the other end portion of said rotary joint with a fastening force generated by said engagement.

5. A rotary evaporator, comprising:

a motor having a motor main body and a rotary means;

a rotary joint insertedly supported and movable in an axial direction relative to said rotary means, with an area of the insertion formed in a straight shape;

a sample container connected to one end of said rotary joint;

a condenser located adjacent the other end portion of said rotary joint and mounted on said motor main body;

at least one bush slidably mounted between said rotary joint and said rotary means;

at least one elastically deformable member disposed between said rotary joint and said rotary means; and a fastening means for pressuring said at least one bush against said rotary means, wherein when said fastening means is tightened, said at least one elastically deformable member is pressured by said fastening means with said at least one bush so that said at least one elastically deformable member is tightly contacted to the outer peripheral surface of said rotary joint and to the inner surface of said rotary means by elastic deformation, thereby integrating said rotary joint and said rotary means.

6. The rotary evaporator of claim 5, wherein said rotary means is provided with a motor rotor and a sleeve integrally engaged with said motor rotor.

7. The rotary evaporator of claim 6, wherein said fastening means is a fastening cap engaged with said sleeve to pressure said at least one bush against said sleeve with a fastening force generated by said engagement.

8. The rotary evaporator of claim 6, wherein said fastening means is a fastening cap engaged with said motor main body to pressure said at least one bush against said sleeve with a fastening force generated by said engagement.

* * * * *